United States Patent
Fu et al.

(10) Patent No.: US 9,596,404 B2
(45) Date of Patent: Mar. 14, 2017

(54) METHOD AND APPARATUS FOR GENERATING A MEDIA CAPTURE REQUEST USING CAMERA POSE INFORMATION

(71) Applicant: Nokia Corporation, Espoo (FI)

(72) Inventors: Junsheng Fu, Tampere (FI); Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 107 days.

(21) Appl. No.: 14/061,476

(22) Filed: Oct. 23, 2013

(65) Prior Publication Data

US 2015/0109508 A1    Apr. 23, 2015

(51) Int. Cl.
    H04N 5/222       (2006.01)
    H04N 5/228       (2006.01)
    H04N 5/232       (2006.01)
    H04N 5/262       (2006.01)

(52) U.S. Cl.
    CPC ..... *H04N 5/23216* (2013.01); *H04N 5/23206* (2013.01); *H04N 5/23222* (2013.01); *H04N 5/23229* (2013.01); *H04N 5/23293* (2013.01); *H04N 5/2628* (2013.01)

(58) Field of Classification Search
    CPC .................................................. H04N 5/23258
    USPC ............................................ 348/222.1, 208.4
    See application file for complete search history.

(56) References Cited

U.S. PATENT DOCUMENTS

| | | | |
|---|---|---|---|
| 8,015,242 B2 | 9/2011 | Ohi et al. | |
| 2009/0110241 A1* | 4/2009 | Takemoto | G06K 9/32 382/103 |
| 2010/0157128 A1 | 6/2010 | Choi et al. | |
| 2011/0071757 A1* | 3/2011 | Lee et al. | 701/208 |
| 2011/0187914 A1* | 8/2011 | Lee | H04N 5/222 348/333.11 |
| 2012/0242798 A1* | 9/2012 | McArdle et al. | 348/46 |
| 2013/0258122 A1* | 10/2013 | Keane et al. | 348/208.4 |

FOREIGN PATENT DOCUMENTS

WO    2013085512 A1    6/2013

OTHER PUBLICATIONS

Kasahara et al., "Second Surface: Multi-user Spatial Collaboration System Based on Augmented Reality", retrieved from the Internet <URL http://fluid.media.mit.edu/sites/default/files/SeconfSurface_.pdf>, 4 pages.

(Continued)

*Primary Examiner* — Joel Fosselman
(74) *Attorney, Agent, or Firm* — Ditthavong & Steiner, P.C.

(57) ABSTRACT

An approach is provided for processing of at least one preview image presented at at least one device to cause, at least in part, an extraction of camera pose information associated with the at least one preview image. The approach also involves determining one or more movement interactions of the at least one device relative to the camera pose information to cause, at least in part, a specification of requested camera pose information. The approach further involves causing, at least in part, a generation of at least one request to capture at least one media item based, at least in part, on the requested camera pose information.

18 Claims, 15 Drawing Sheets

(56) References Cited

OTHER PUBLICATIONS

Shingu et al., "Camera Pose Navigation Using Augmented Reality", retrieved from the internet <URL http://www.fxpal.com/publications/FXPAL-PR-10-635.pdf>, 2 pages.
Christian Doppler Laboratory, "Full 6-DOF Localization Framework", retrieved from the internet <URL http://handheldar.icg.tugraz.at/localization.php>, retrieved date Sep. 16, 2013, pp. 1-5.

* cited by examiner

METHOD AND APPARATUS FOR GENERATING A MEDIA CAPTURE REQUEST USING CAMERA POSE INFORMATION

BACKGROUND

As the quality and resolution of cameras integrated on mobile communication devices are improving, many users are relying on the mobile communication devices as a primary means for taking pictures and/or videos. With such increasing use of the mobile communication devices for media related activity, image browsing has also become a common trend among the users of the mobile communication devices. During image browsing a user may view a scene from different angles and may want to have an image of the scene from the preferred angle. However, it is challenging for the user to have the exact image either because the user is not physically present at the prescribed location or it is hard for the user to request for a precise image capture in a verbal or a non-verbal manner. Further, it is demanding to describe the exact camera position without using the global camera pose and it is rather difficult for the other user capturing the image to follow the requirements for taking the exact image that conforms to the specification of the requester. Accordingly, service providers and device manufacturers (e.g., wireless, cellular, etc.) face significant technical challenges in providing a service that generates a request for capturing at least one media item based on the camera pose information preferred by at least one user.

SOME EXAMPLE EMBODIMENTS

Therefore, there is a need for an approach for causing an extraction of camera pose information associated with the at least one preview image to further cause a generation of at least one request to capture at least one media item based, at least in part, on the requested camera pose information.

According to one embodiment, a method comprises processing and/or facilitating a processing of at least one preview image presented at at least one device to cause, at least in part, an extraction of camera pose information associated with the at least one preview image. The method also comprises determining one or more movement interactions of the at least one device relative to the camera pose information to cause, at least in part, a specification of requested camera pose information. The method further comprises causing, at least in part, a generation of at least one request to capture at least one media item based, at least in part, on the requested camera pose information.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of at least one preview image presented at at least one device to cause, at least in part, an extraction of camera pose information associated with the at least one preview image. The apparatus is also caused to determine one or more movement interactions of the at least one device relative to the camera pose information to cause, at least in part, a specification of requested camera pose information. The apparatus is further caused to cause, at least in part, a generation of at least one request to capture at least one media item based, at least in part, on the requested camera pose information.

According to another embodiment, a computer-readable storage medium carries one or more sequences of one or more instructions which, when executed by one or more processors, cause, at least in part, an apparatus to process and/or facilitate a processing of at least one preview image presented at at least one device to cause, at least in part, an extraction of camera pose information associated with the at least one preview image. The apparatus is also caused to determine one or more movement interactions of the at least one device relative to the camera pose information to cause, at least in part, a specification of requested camera pose information. The apparatus is further caused to cause, at least in part, a generation of at least one request to capture at least one media item based, at least in part, on the requested camera pose information.

According to another embodiment, an apparatus comprises means for processing and/or facilitating a processing of at least one preview image presented at at least one device to cause, at least in part, an extraction of camera pose information associated with the at least one preview image. The apparatus also comprises means for determining one or more movement interactions of the at least one device relative to the camera pose information to cause, at least in part, a specification of requested camera pose information. The apparatus further comprises means for causing, at least in part, a generation of at least one request to capture at least one media item based, at least in part, on the requested camera pose information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes)

disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for causing an extraction of camera pose information associated with the at least one preview image to further cause a generation of at least one request to capture at least one media item based, at least in part, on the requested camera pose information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Needless to mention, if a user wants to have a picture of a monument from a preferred camera pose and does not want to physically visit the location, it is difficult for the user to get a picture with the particular camera pose. In addition, it is difficult for the other user in the prescribed location to capture the exact image that conforms to the specification of the requesting user because it is demanding to describe the exact camera position without using the global camera pose.

Figure 1:
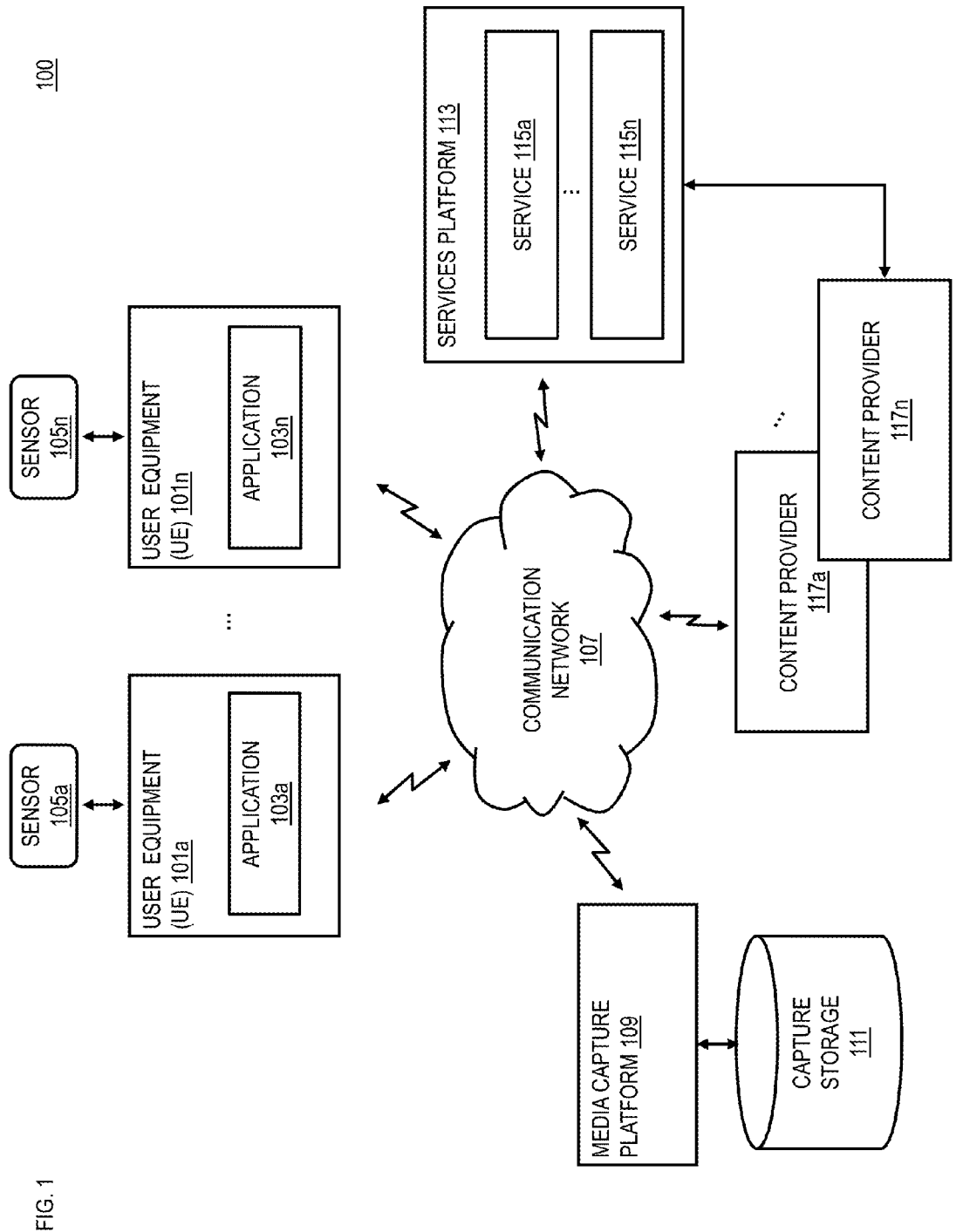
FIG. 1 is a diagram of a system capable of causing an extraction of camera pose information associated with the at least one preview image to further cause a generation of at least one request to capture at least one media item based, at least in part, on the requested camera pose information, according to one embodiment.

To address this problem, a system 100 of FIG. 1 introduces the capability to capture an image of a scene at a particular camera pose (angle/orientation). In this process, a user while browsing an image gallery locally or on the internet may select an image of a scene which he/she wants to view in different poses. This selected image is sent to GeoVideo Tagging Engine over the communication network 107 to extract global camera poses of the image. Next, the user may select the desired pose which he/she wants. In one scenario, the user may manipulate the image obtained from the content provider by panning or tilting the phone, pursuant to which the user may submit the selected pose along with image of scene to the media capture platform 109. Subsequently, the media capture platform 109 sends this request to the already present clients in the location of the requested scene and assists them in capturing the scene at a desired pose. The at least one client captures the scene and sends them back to the media capture platform 109, and the media capture platform 109 may further relay the media to the media requester. As another embodiment, when the user who requests the image of a scene at a desired pose visits the location of the scene, he/she automatically gets the notification reminding him of the desired scene pose to be clicked.

As shown in FIG. 1, the system 100 comprises user equipment (UE) 101a-101n (collectively referred to as UEs 101) that may include or be associated with applications 103a-103n (collectively referred to as applications 103) and sensors 105a-105n (collectively referred to as sensors 105). In one embodiment, the UEs 101 have connectivity to the media capture platform 109 via the communication network 107.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as camera/imaging application, media player applications, social networking applications, calendar applications, content provisioning services, location-based service applications, navigation applications and the like. In one embodiment, one of the applications 103 at the UE 101 may act as a client for media capture platform 109 and perform one or more functions associated with the functions of the media capture platform 109.

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, etc.). In one embodiment, the sensors 105 may detect user interaction with a user interface generated by the UE 101, applications 103, and/or the media capture platform 109. The sensors 105 may work in conjunction with the media capture platform 109, wherein the sensors 105 identifies a point on the user interface that the user selects, such as by brushing, clicking, or touching the screen of the UE 101.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the media capture platform 109 may be a platform with multiple interconnected components. The media capture platform 109 may include multiple servers, intelligent networking devices, computing devices, components and corresponding software for causing an extraction of camera pose information associated with the at least one preview image to further cause a generation of at least one request to capture at least one media item based, at least in part, on the requested camera pose information. In one embodiment, the media capture platform 109 processes and/or facilitates a processing of at least one preview image presented at at least one device to cause, at least in part, an extraction of camera pose information associated with the at least one preview image. In one scenario, User Z wants to have a picture of the Eiffel Tower in a preferred camera pose, but user Z does not want to physically go to Paris. Then, User Z may select a camera pose for the at least one image of the Eiffel Tower, consequently the media capture platform 109 may process the preview image of the at least one user selected image to cause an extraction of the camera pose information.

In another embodiment, the media capture platform 109 determines one or more movement interactions of the at least one device relative to the camera pose information to cause, at least in part, a specification of requested camera pose information. In one scenario, the media capture platform 109 may determine one or more requests to capture media related to the one or more camera poses. Subsequently, the media capture platform 109 sends this request to the already present user in the location of the requested scene and assists them in capturing the scene at a desired pose. The at least one user captures the scene and sends them back to the media capture platform 109, and the media capture platform 109 may further relay the captured media to the media requester.

In another embodiment, the media capture platform 109 causes, at least in part, a generation of at least one request to capture at least one media item based, at least in part, on the requested camera pose information. In one scenario, the media capture platform 109 may cause an association of the one or more reference images during the media request presentation for interaction by one or more media capturing users. Further, the media capture platform 109 may cause, at least in part, one or more indicators to notify the media capturing users that the captured media confirms with the requested media.

In one embodiment, the media capture platform 109 may receive media information from various sources, for example, the sensors 105, registered media databases, etc. and may store the received information on the capture storage 111. The capture storage 111 may include identifiers to the UE 101 or media as well as associated information. Further, the information may be any multiple types of information that can provide means for aiding in the media provisioning process.

The services platform 113 may include any type of service. By way of example, the services platform 113 may include content (e.g., audio, video, images, etc.) provisioning services, application services, storage services, contextual information determination services, location based services, social networking services, information (e.g., weather, news, etc.) based services, etc. In one embodiment, the services platform 113 may interact with the UE 101, the media capture platform 109 and the content providers 117a-117n (hereinafter content provider 117) to supplement or aid in the processing of the content information.

By way of example, services 115a-115n (hereinafter services 115) may be an online service that reflects interests and/or activities of users. In one scenario, the services 115 provide representations of each user (e.g., a profile), his/her social links, and a variety of additional information. The services 115 allow users to share media information, location information, activities information, contextual information, and interests within their individual networks, and provides for data portability. The services 115 may additionally assist in providing the media capture platform 109 with media capture capability information, media capture reputation information, social relationship information, etc.

The content provider 117 may provide content to the UE 101, the media capture platform 109, and the services 115 of the services platform 113. The content provided may be any type of content, such as image content, video content, audio content, textual content, etc. In one embodiment, the content provider 117 may provide content that may supplement content of the applications 103, the sensors 105, the capture storage 111 or a combination thereof. By way of example, the content provider 117 may provide content that may aid in causing a generation of at least one request to capture at least one media item. In one embodiment, the content provider 117 may also store content associated with the UE 101, the media capture platform 109, and the services 115 of the services platform 113. In another embodiment, the content provider 117 may manage access to a central repository of data, and offer a consistent, standard interface to data, such as a repository of users' navigational data content.

By way of example, the UE 101, the media capture platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
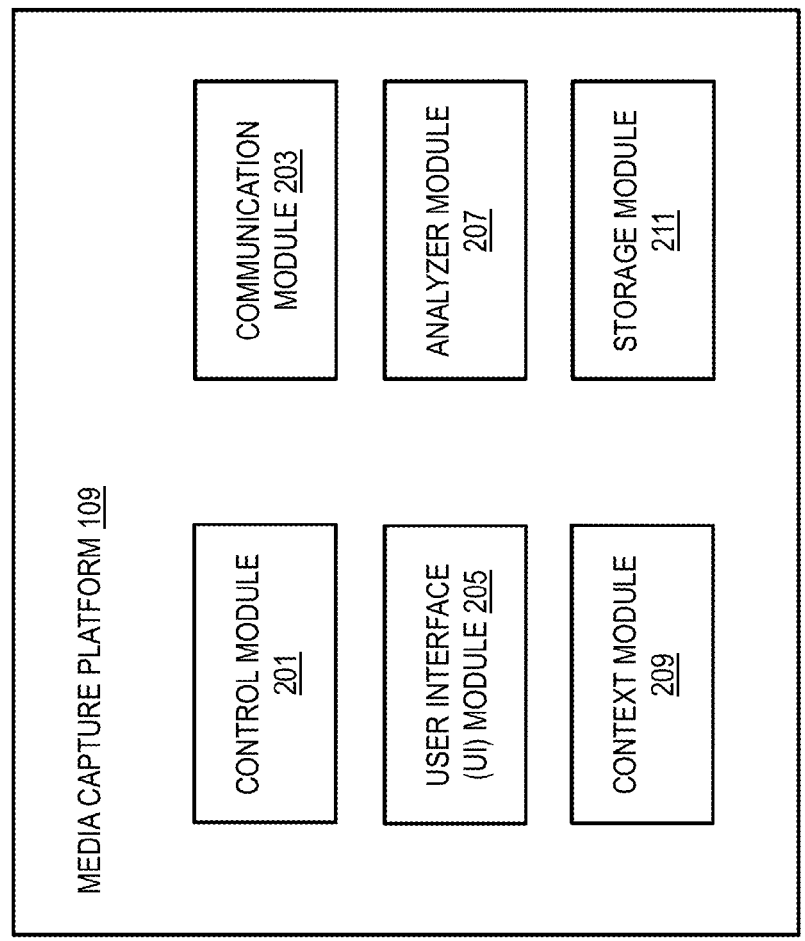
FIG. 2 is a diagram of the components of the media capture platform 109, according to one embodiment.

FIG. 2 is a diagram of the components of the media capture platform 109, according to one embodiment. By way of example, the media capture platform 109 includes one or more components for determining requests from one or more users to capture media related to the one or more camera poses and causing a presentation of the media request to the at least one user determined to be within the vicinity of one or more locations as indicated by the requested camera pose information, according to one embodiment. It is contemplated that the functions of these components may be combined in one or more components or performed by other components of equivalent functionality. In this embodiment, the media capture platform 109 includes a control module 201, a communication module 203, a user interface (UI) module 205, an analyzer module 207, a context module 209, and a storage module 211.

The control module 201 may execute an algorithm for processing a query associated with the UEs 101 (e.g., UE 101a) for requesting media to at least other UEs 101 (e.g., the UE 101b) based, at least in part, on the location information. By way of another example, the control module 201 may execute an algorithm to interact with the communication module 203 to communicate between the request sending UE 101 and the other UE 101 within the vicinity of the prescribed location. The control module 201 may also execute an algorithm to interact with the user interface module 205 to render a presentation for one or more media requests. The control module 201 also may execute an algorithm to interact with the analyzer module 207 to analyze one or more requests, one or more example media, one or more device capability information, one or more media capture reputation information, one or more social relationships information, or a combination thereof, among one or more requesting users and one or more other users within the vicinity of the prescribed location. The control module 201 may also execute an algorithm to interact with the context module 209 to determine the context or situation of the UEs 101. In addition, the control module 201 also may execute an algorithm to interact with the storage module 211 to temporarily store example media that can be used by the one or more other users for guidance for capturing the requested media.

The communication module 203 is used for communicating commands, requests, data, etc. between the requesting UE 101 and the other UE 101 determined to be within the vicinity of the location indicated by the requested camera pose information. By way of example, the communication module 203 may be used to transmit one or more requests to capture media from one or more UEs 101 to one or more other UEs 101. In one embodiment, the communication module 203, in connection with the user interface module 205 is used to present other users in the vicinity of the prescribed location with example media as guidance for capturing the requested media.

The user interface (UI) module 205 is used to present the one or more users in the vicinity of the location as indicated by the requested camera pose information with one or more requests to capture the media. More specifically, the user interface module 205 is used to render a user interface element for causing an initiation of the one or more request to capture media. In addition, the user interface module 205 is further used to render one or more control elements in the same user interface for sharing the requested media with the one or more requesting users. In one embodiment, the user interface module 205 can also be used, in connection with the communication module 203 to present to the one or more other users with example media as guidance for capturing the requested media. More specifically, the user interface module 205 presents the example media in the same user interface that includes the one or more control elements for capturing the requested media.

In one embodiment, the analyzer module 207 may determine example media to be presented by the user interface module 205 to other users within the vicinity of the prescribed location as guidance information for capturing the requested media. More specifically, the analyzer module 207 determines the example media based on one or more requests of the request sending UE 101. The analyzer module 207 can also be used to determine example media that illustrate recommended viewpoints, frames, one or more subjects, or a combination thereof. In one embodiment, the analyzer module 207 can be used to determine explicit requests (e.g., "take a picture") or implicit requests (e.g., utilizing a "Take photo" icon). The analyzer module 207, in connection with the user interface module 205, can also be used to process the one or more requests for media based on a grouping, a categorization, or a combination thereof of the one or more requests. For example, the analyzer module 207 may determine to combine one or more requests for media related to the Great Wall of China and one or more requests for media related to the tourists visiting the Great Wall of China into one request for media. In this instance, the analyzer module 207, in connection with the user interface module 205, presents the one or more users within the vicinity of the prescribed location with one request for media that will in fact response to at least two different requests for media. In another embodiment, the analyzer module 207 can determine, based on device capability information, whether one or more users is proficient in capturing a particular type of media. In another example, the analyzer module 207 can determine to re-distribute one or more requests for media among other users in the vicinity of the prescribed location, if for example, at least one user in the vicinity of the prescribed location have already received a large number of requests for media. The analyzer module 207 can further be used to determine one or more social relationships among the one or more other users and the one or more requesting users. Based on this information, the analyzer module 207 can then prioritize the one or more requests for media.

The context module 209 may determine the geographic or temporal context situation of a UE 101 by utilizing location-based technologies (e.g., global positioning system (GPS) receivers, cellular triangulation, assisted-GPS (A-GPS), etc.) to determine location (e.g., geographic coordinates) and/or temporal information (e.g., time of day) regarding a UE 101. More specifically, the context module 209, in connection with the user interface module 205 and the analyzer module 207, can determine to indicate one or more requests for media to one or more users within the vicinity of one or more locations as indicated by the requested camera pose information. The context module 209, in connection with the analyzer module 207, can also be used to determine example media to present to one or more users as guidance for capturing the requested media. In one embodiment, the context module 209 can be used in connection with the communication module 203 and the analyzer module 207 to cause a distribution of the one or more requests for media among the one or more users based, at least in part, on their location information, device capability information, or a combination thereof. By way of example, if a user requests for a high definition image of the Great Wall of China, the analyzer module 207 may determine device capability information for one or more users in the vicinity of the prescribed location, and the context module 209 can determine at least one user that is best able to capture the requested media.

The storage module 211 can be used to temporarily store example media determined by the analyzer module 207 and/or the context module 209 that is associated with one or more media requests, one or more globally registered images associated with the media request, one or more street-view images associated with the media request or a combination thereof.

Figure 3:
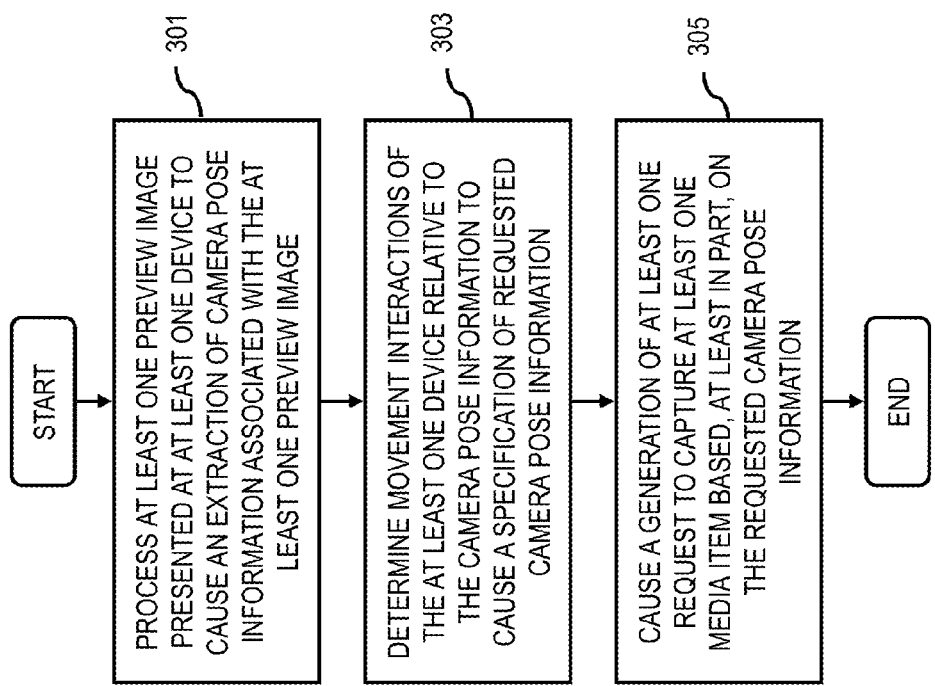
FIG. 3 is a flowchart of a process for causing an extraction of camera pose information associated with the at least one preview image to further cause a generation of at least one request to capture at least one media item based, at least in part, on the requested camera pose information, according to one embodiment.
Figure 14:
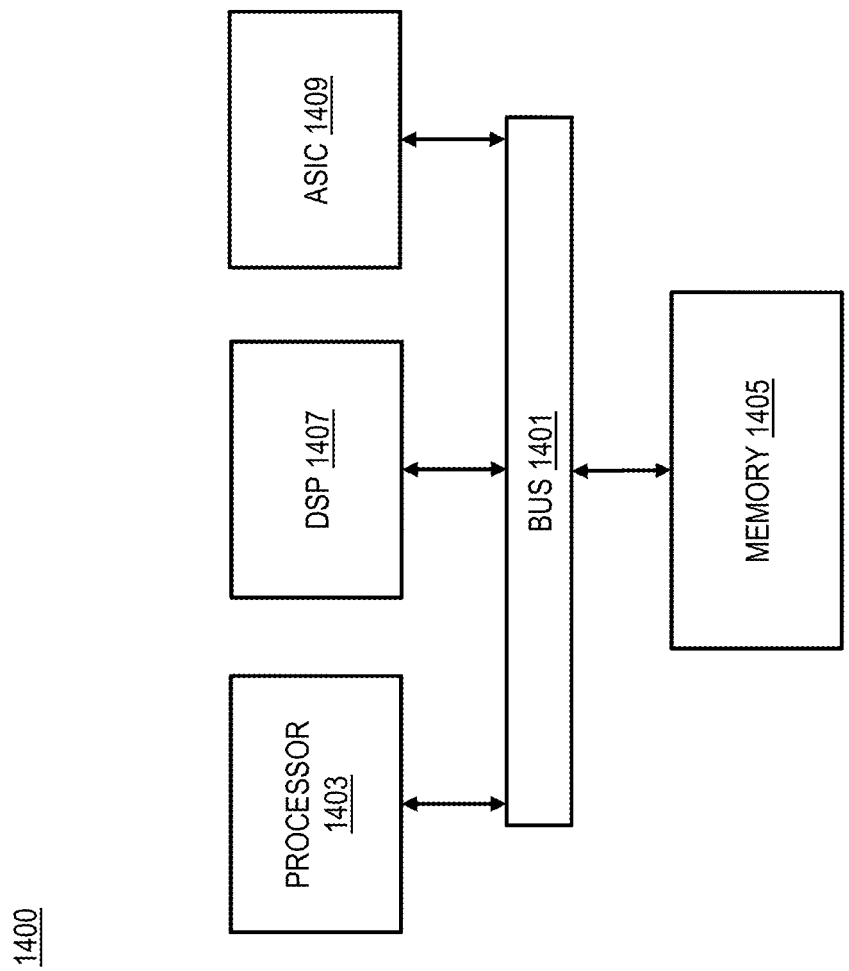
FIG. 14 is a diagram of a chip set that can be used to implement an embodiment of the invention.

FIG. 3 is a flowchart of a process for causing an extraction of camera pose information associated with the at least one preview image to further cause a generation of at least one request to capture at least one media item based, at least in part, on the requested camera pose information, according to one embodiment. In one embodiment, the media capture platform 109 performs the process 300 and is implemented in, for instance, a chip set including a processor and a memory as shown in FIG. 14.

In step 301, the media capture platform 109 processes and/or facilitates a processing of at least one preview image presented at at least one device to cause, at least in part, an extraction of camera pose information associated with the at least one preview image. In one embodiment, the at least one preview image includes, at least in part, one or more street-view images, one or more globally registered images, or a combination thereof. In one example embodiment, the media capture platform 109 may extract camera pose information from one or more selected images wherein the camera pose information is represented according to a global coordinate system. In one scenario, a user while browsing pictures may move their respective UE 101 or preview-pane to browse for a new candidate camera pose. The user may choose a view that matches his/her interest and the corresponding camera pose is sent as a media request. This media request can be used by the user to capture pictures or it can be messaged to other friends or even made public. In one embodiment, the global coordinate system includes, at least in part, an Earth centered Earth fixed (ECEF) coordinate system, a world geodetic system (WGS84) coordinate system, a universal transverse Mercator (UTM) coordinate system, or a combination thereof.

In step 303, the media capture platform 109 determines one or more movement interactions of the at least one device relative to the camera pose information to cause, at least in part, a specification of requested camera pose information. In one embodiment, the camera pose information, the requested camera pose information, or a combination thereof is specified according to a global coordinate system. In another embodiment, the media capture platform 109 may determine one or more camera pose information based, at least in part, on the height, the tilt, the angle, or a combination thereof. Subsequently, the media capture platform 109 generates a specification of the requested camera pose information that corresponds with the users' interest.

In step 305, the media capture platform 109 causes, at least in part, a generation of at least one request to capture at least one media item based, at least in part, on the requested camera pose information. In one scenario, the media capture platform 109 causes transfer of the one or more media requests from the requesting users to the other users within a set radius of the one or more media request's geo-location upon determination of a specification of the requested camera pose information. In one scenario, the one or more media request can either be delivered as a push notification or it may appear as a pending request when the user activates his/her UE 101. In one embodiment, the media capture platform 109 determines geo-locations of the at least one media request, and notifies one or more users of the media request to the at least one device within the geolocation.

Figure 4:
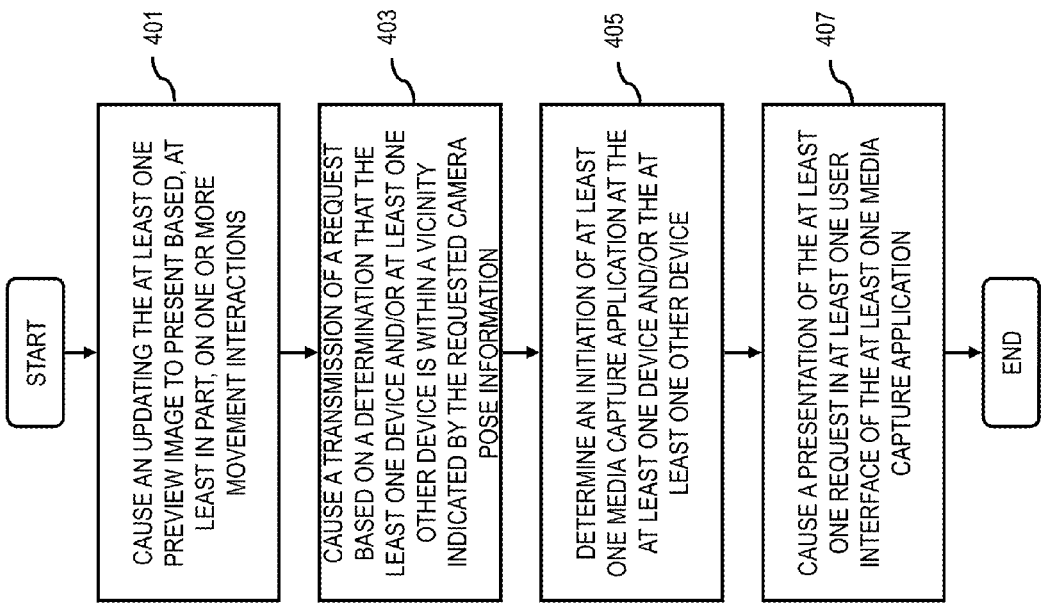
FIG. 4 is a flowchart of a process for causing a transmission and a presentation of at least one request based on a determination that at least one device is within a vicinity of one or more locations indicated by the requested camera pose information, according to one embodiment.

FIG. 4 is a flowchart of a process for causing a transmission and a presentation of at least one request based on a determination that at least one device is within a vicinity of one or more locations indicated by the requested camera pose information, according to one embodiment. In one embodiment, the media capture platform 109 performs the process 400 and is implemented in, for instance, a chip set including a processor and a memory as shown in FIG. 14.

In step 401, the media capture platform 109 causes, at least in part, an updating the at least one preview image to present based, at least in part, on one or more movement interactions. In one embodiment, the media capture platform 109 leverages globally registered images to provide an intuitive image exploration mechanism to assist in choosing a camera pose of interest. In one scenario, when a user is manipulating the image of interest, the images corresponding to the manipulated angles are retrieved from globally registered image database as preview image which may assist the user in making a choice of camera pose to be used in the request.

In step 403, the media capture platform 109 causes, at least in part, a transmission of the at least one request to the at least one device, at least one other device, or a combination thereof based, at least in part, on a determination that the at least one device, at least one other device, or a combination thereof is within a vicinity of one or more locations indicated by the requested camera pose information. In one scenario, a user may find the picture of a popular monument very interesting and he/she wishes to take similar picture of the monument when he/she travels to that destination. If the user travels to the said destination the user may be prompted with a notification instructing the user to take the picture with that particular camera pose. In another scenario, the media capture platform 109 may cause a presentation of a media request to other users within a vicinity of one or more locations indicated by the requested camera pose information to capture the image in a manner prescribed by the request sending user.

In step 405, the media capture platform 109 determines an initiation of at least one media capture application at the at least one device, the at least one other device, or a combination thereof. In one embodiment, the media capture platform 109 causes calculation of the presentation of the one or more images based, at least in part, on the capture capability information of the at least one device which may be determined in parts from the device's sensor inputs. In another embodiment, the media capture platform 109 may cause, at least in part, an association of one or more other images with the at least one presentation for interaction by at least one user during the rendering of the presentation.

In step 407, the media capture platform 109 causes, at least in part, a presentation of the at least one request in at least one user interface of the at least one media capture application. In one scenario, the media capture platform 109 causes a presentation of the at least one media request in the UE 101 of other users determined to be within the vicinity of the at least one location indicated by the requested camera pose information. The presentation may be based, at least in part, on the media capture capability of the at least one device.

Figure 5:
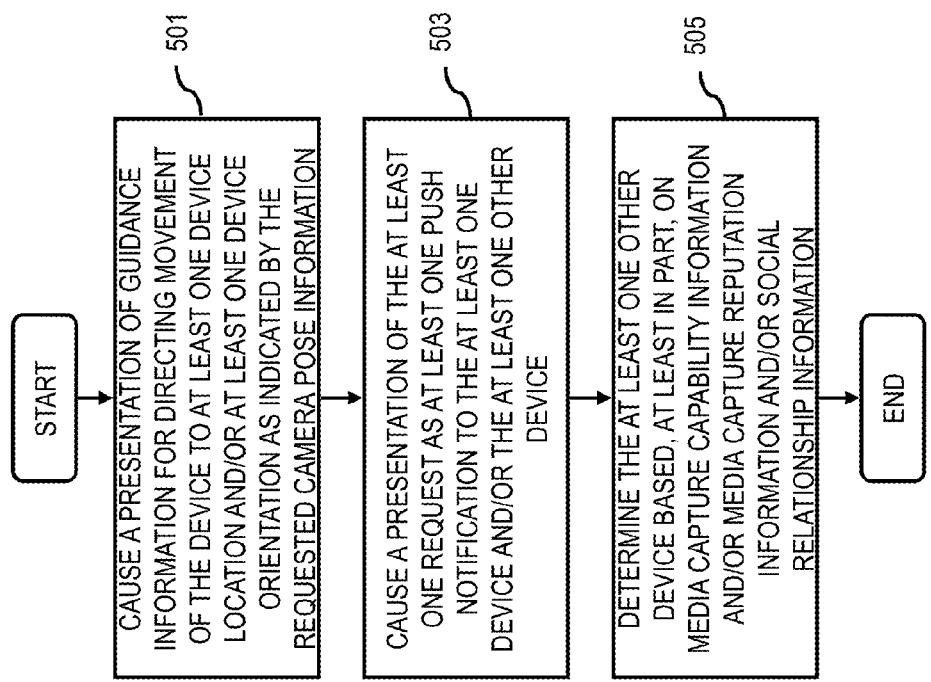
FIG. 5 is a flowchart of a process for causing a presentation of guidance information for directing at least one movement of a device, and of the at least one push notification to the at least one device, and further causing a determination of least one other device for media provisioning, according to one embodiment.

FIG. 5 is a flowchart of a process for causing a presentation of guidance information for directing at least one movement of a device, and of the at least one push notification to the at least one device, and further causing a determination of least one other device for media provisioning, according to one embodiment. In one embodiment, the media capture platform 109 performs the process 500 and is implemented in, for instance, a chip set including a processor and a memory as shown in FIG. 14.

In step 501, the media capture platform 109 causes, at least in part, a presentation of guidance information for directing at least one movement of the device to at least one device location, at least one device orientation, or a combination thereof as indicated by the requested camera pose information. In one embodiment, the guidance information includes, at least in part, (a) one or more representative images, (b) navigation information, (c) one or more indicators for confirming compliance with the requested camera pose information, (d) wireframe guides, or (e) a combination thereof. In one embodiment, the media capture platform 109 causes a presentation of one or more representative images alongside guidance information for navigating the at least one other user. The at least one other user within a vicinity of one or more locations indicated by the requested camera pose information may be navigated to the at least one position for pointing the at least one camera to the at least one target. In another embodiment, the media capture platform 109 may cause a presentation of one or more indicators to notify the at least one other user that the at least one camera pose confirms with the media requests.

In step 503, the media capture platform 109 causes, at least in part, a presentation of the at least one request as at least one push notification to the at least one device, the at least one other device, or a combination thereof. In one embodiment, the media capture platform 109 determines one or more other images associated with the camera location information and/or the camera pose information associated with the at least one media request. In another embodiment, the media capture platform 109 determines overlay information for the determined one or more other images and causes a rendering of the overlay information. The one or more presentation caused by the media capture platform 109 in the UE 101 of other users in the vicinity of the media request geo location may be delivered as a push notification or it may appear as a pending request when the user activates his/her UE 101 application.

In step 505, the media capture platform 109 determines the at least one other device based, at least in part, on media capture capability information, media capture reputation information, social relationship information, or a combination thereof. In one embodiment, the media capture platform 109 may cause prioritization of the one or more media requests based, at least in part, on social relationship information among the one or more requesting users, the one or more capturing users, or a combination thereof. In another embodiment, the media capture platform 109 may cause a presentation of the one or more images from public databases for regions not covered by registered images.

Figure 6:
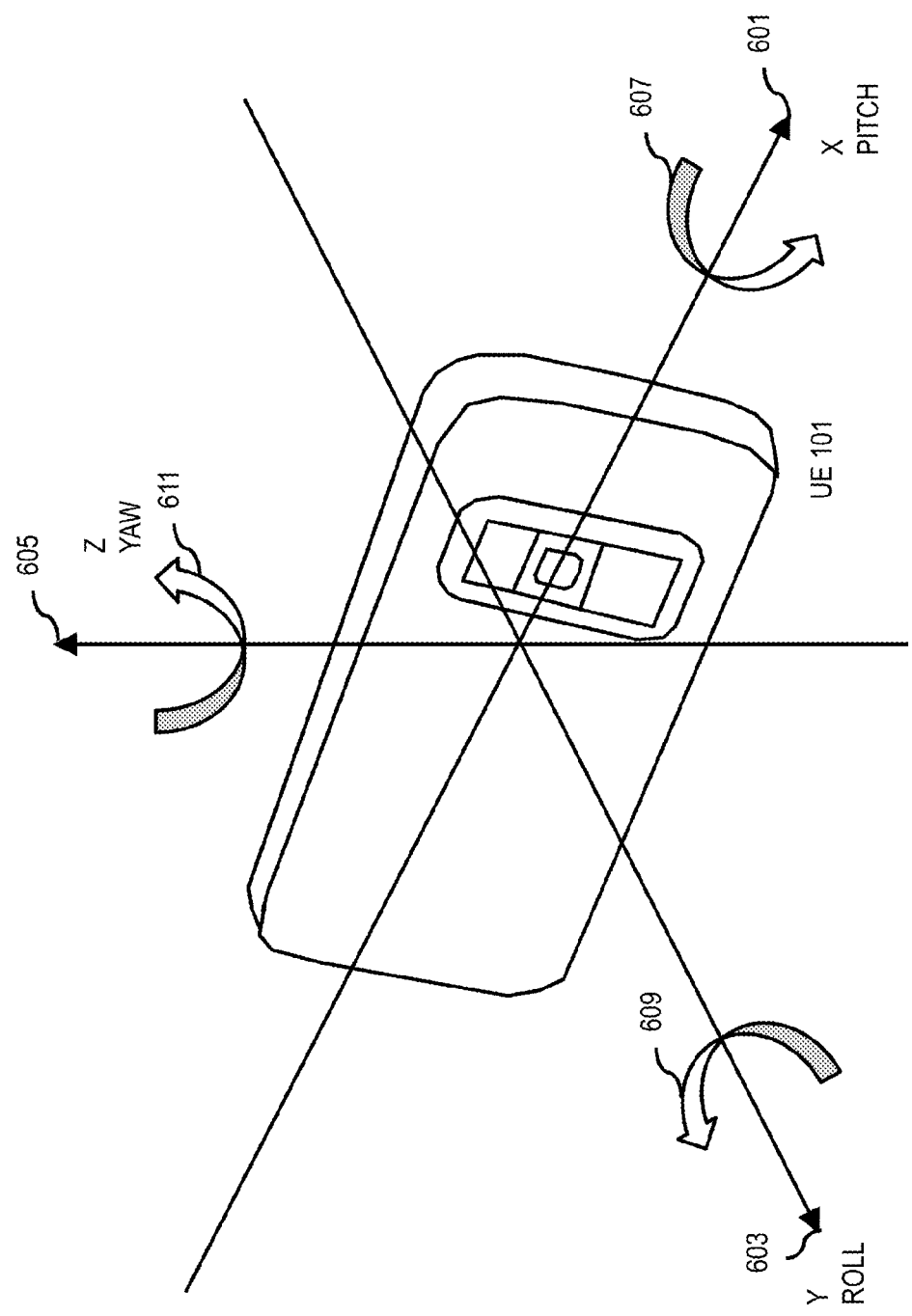
FIG. 6 is a diagram that represents a camera orientation in a 3D space utilized in the process of FIGS. 3-5, according to one embodiment.

FIG. 6 is a diagram that represents a camera orientation in a 3D space utilized in the process of FIGS. 3-5, according to one embodiment. The camera pose of associated video frames represents 3D locations and orientations of the video-capturing-camera at the time when video frames were recorded. The camera location can be simply described as x (601), y (603), and z (605). On the other hand, the orientation can be described as pitch (607), roll (609) and yaw (611) angles of rotating the camera from a reference placement to its current placement. In one scenario, pitch is a counter-clockwise rotation along the x axis, roll is a counterclockwise rotation along the y axis, and yaw is a counterclockwise rotation along the z axis. In another scenario, the orientation can be represented by rotation matrices or quaternions, which are mathematically equivalent to Euler angles. With the camera location and orientation, one can define the camera movement with six degrees of freedom (6-DoF) in a coordinate system.

Figure 7:
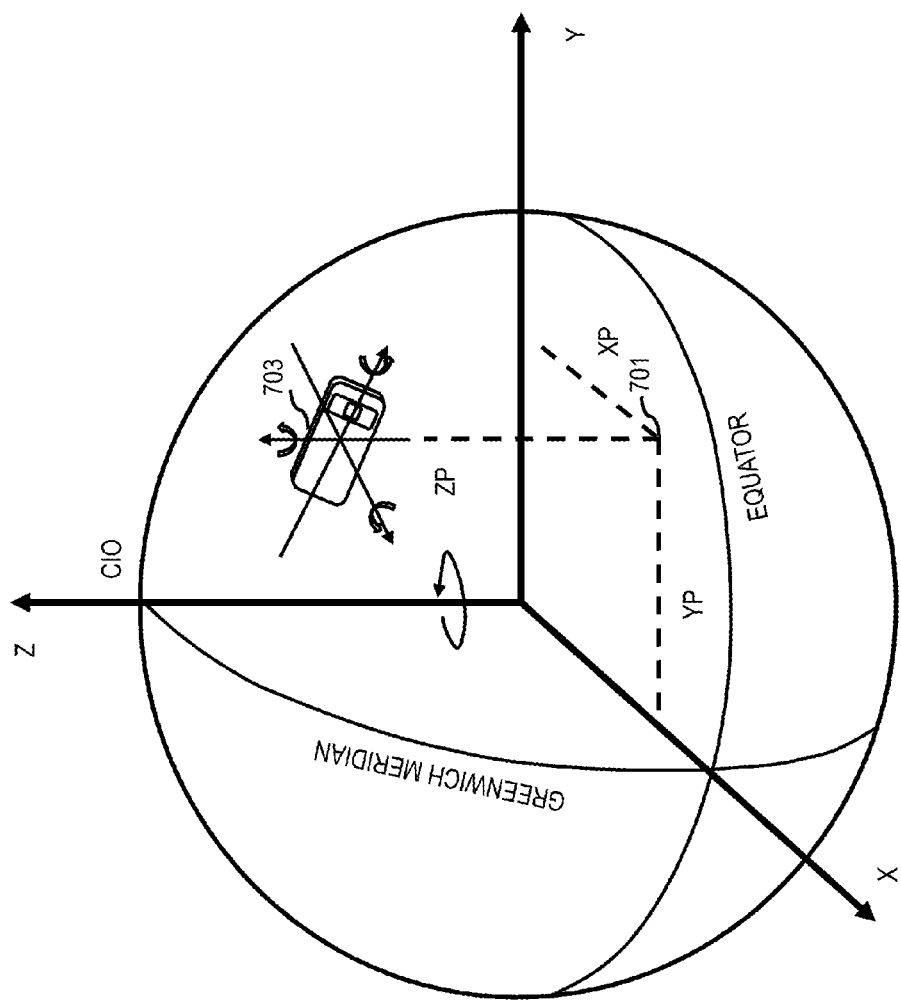
FIG. 7 is a diagram that represents a global camera pose in the Earth-Centered, Earth-Fixed (ECEF) cartesian coordinate system (CCS_3D_ECEF, 3D) utilized in the process of FIGS. 3-5, according to one embodiment.

FIG. 7 is a diagram that represents a global camera pose in the Earth-Centered, Earth-Fixed (ECEF) Cartesian Coordinate System (CCS_3D_ECEF, 3D) utilized in the process of FIGS. 3-5, according to one embodiment. In one scenario, a point cloud is a set of 3D points that are viewable from one or more multiple video frames, when viewed from a given camera pose (701), 3D points are projected, according to proper camera models, onto the 2D image and gives rise to color intensities at different pixel locations (703). In the context of Earth modeling, 3D point clouds can be directly measured by Light Detection and Ranging (LIDAR) technology. Alternatively, 3D point clouds can be reconstructed from input video frames by using computer vision Structure-From-Motion (SFM) technology. Within CCS_3D_ECEF, 3D point clouds as well as camera poses needs to be accurately defined:

(1) When a CCS_3D_ECEF is used, the camera poses and the point clouds are globally defined.

(2) If a CCS_3D_Local system with known origin and axes is used, the camera poses and point clouds can be uniquely mapped to the CCS_3D_ECEF. By doing this, the camera pose is also defined in a global coordinate system. Besides, if a CCS_3D_Local system with unknown origin and axes is used, camera poses and point clouds can only be defined within the local coordinate system, because of the difficulty to map point-clouds and camera poses into CCS_3D_ECEF.

Figure 8:
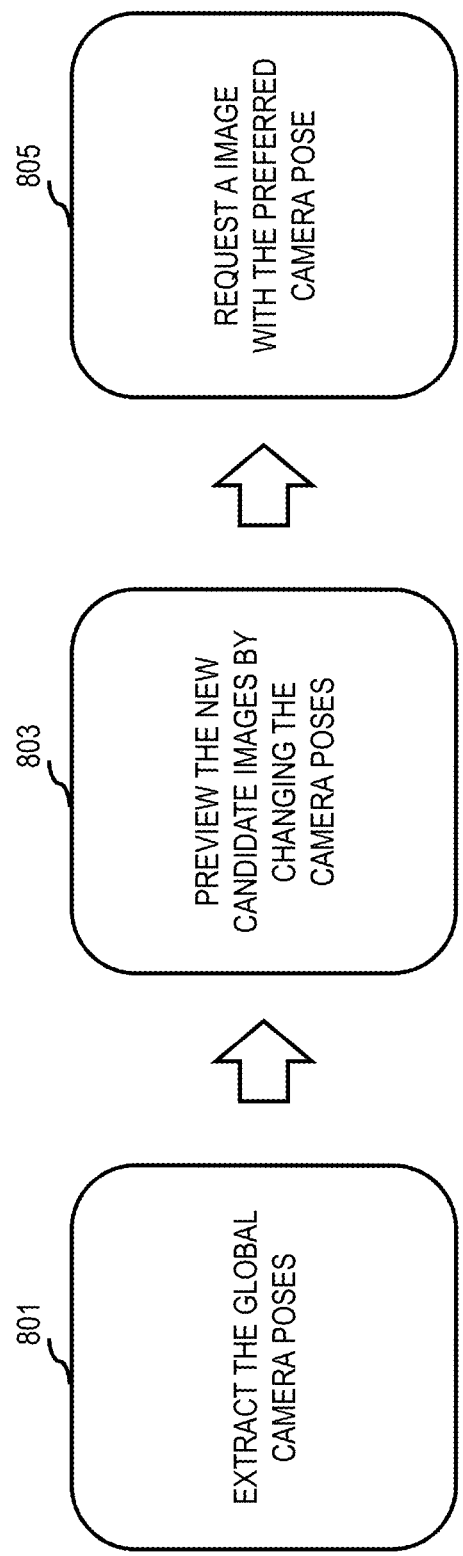
FIG. 8 is a diagram that represents the three main steps undertaken by the media capture platform 109 in requesting media utilized in the process of FIGS. 3-5, according to one embodiment.

FIG. 8 is a diagram that represents the three main steps undertaken by the media capture platform 109 in requesting media utilized in the process of FIGS. 3-5, according to one embodiment. In step 1, the media capture platform 109 may extract the global camera poses (801). In step 2, the media capture platform 109 previews the new candidate images by changing the camera poses (803). In step 3, the media capture platform 109 may request an image with the preferred camera pose (805).

Figure 9:
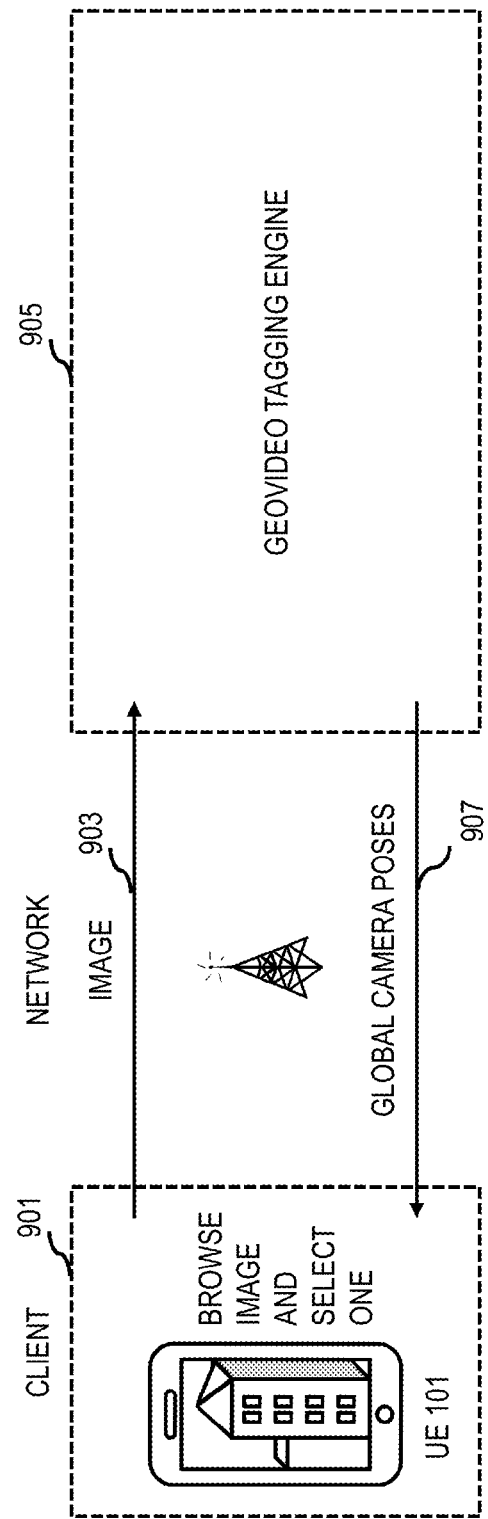
FIG. 9 is a diagram that represents the first step undertaken by the media capture platform 109 in extracting the global camera pose of an image utilized in the process of FIGS. 3-5, according to one embodiment.

FIG. 9 is a diagram that represents the first step undertaken by the media capture platform 109 in extracting the global camera pose of an image utilized in the process of FIGS. 3-5, according to one embodiment. In one scenario, a user may select at least one image during image browsing either locally or on the internet via his/her UE 101 (901), and then the media capture platform 109 sends the image to the GeoVideo Tagging Engine (903). In one embodiment, the GeoVideo Tagging engine (905) extracts accurate geo-location metadata from input data. The input to the GeoVideo Tagging engine can be either a collection of images or a sequence of video frames. After processing, the engine outputs a set of geo-location metadata, including registered video frames, corresponding camera poses and reconstructed 3D point clouds (907). All these data are defined within a CCS_3D_Local system with known origin and axes. Therefore, camera poses and point clouds can be uniquely mapped to the CCS_3D_ECEF.

Figure 10:
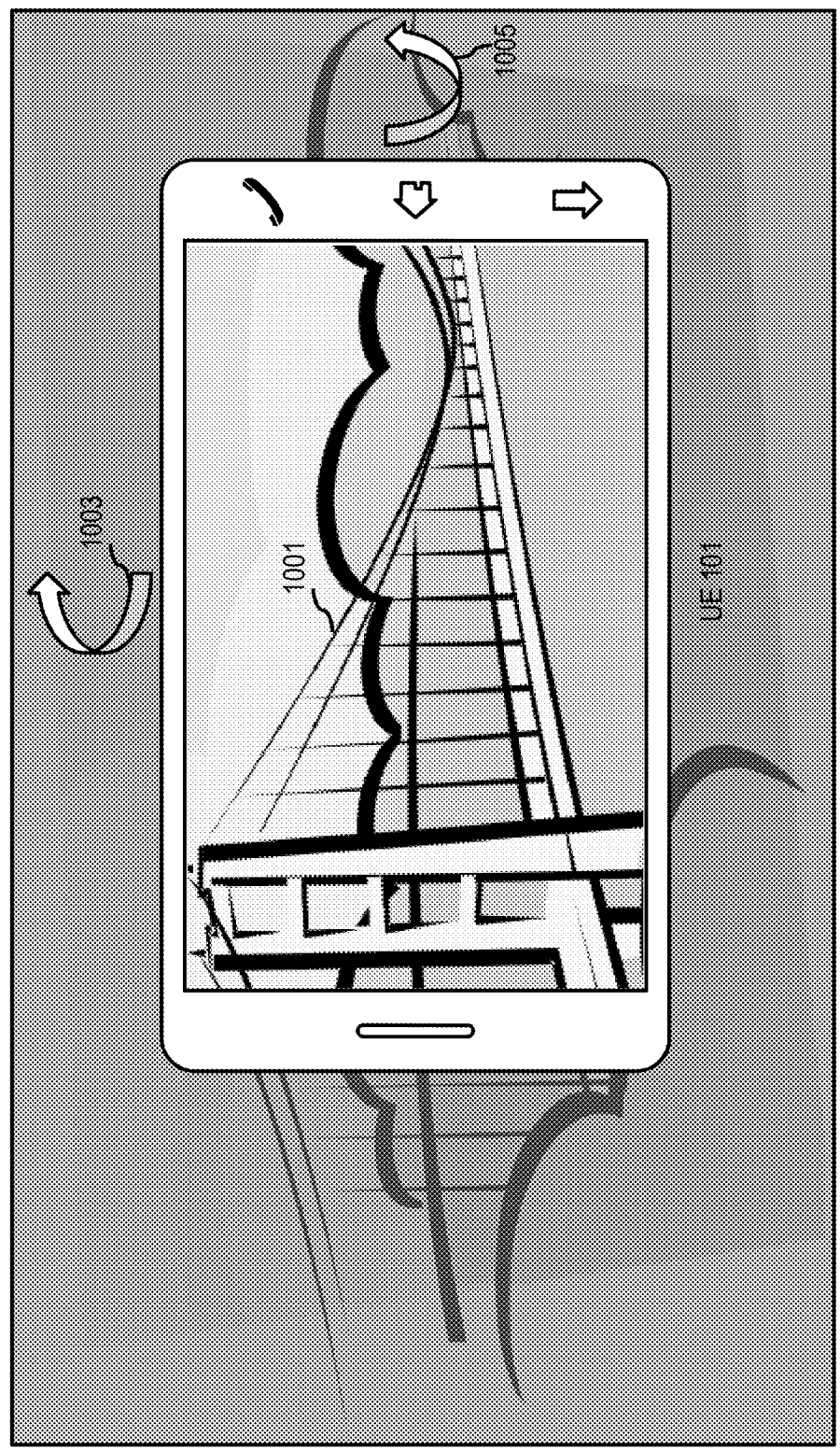
FIG. 10 is a diagram that represents a scenario wherein the media capture platform 109 previews one or more new candidate images by changing camera poses utilized in the process of FIGS. 3-5, according to one embodiment.

FIG. 10 is a diagram that represents a scenario wherein the media capture platform 109 previews one or more new candidate images by changing camera poses utilized in the process of FIGS. 3-5, according to one embodiment. In one scenario, the media capture platform 109 may instruct a user to tilt his/her UE 101 (1003, 1005) or pan the image to change the camera pose and see the scene from another angle (1001). In one embodiment, the media capture platform 109 may render at least one scene with the help of nearby street view images and globally registered images.

Figure 11:
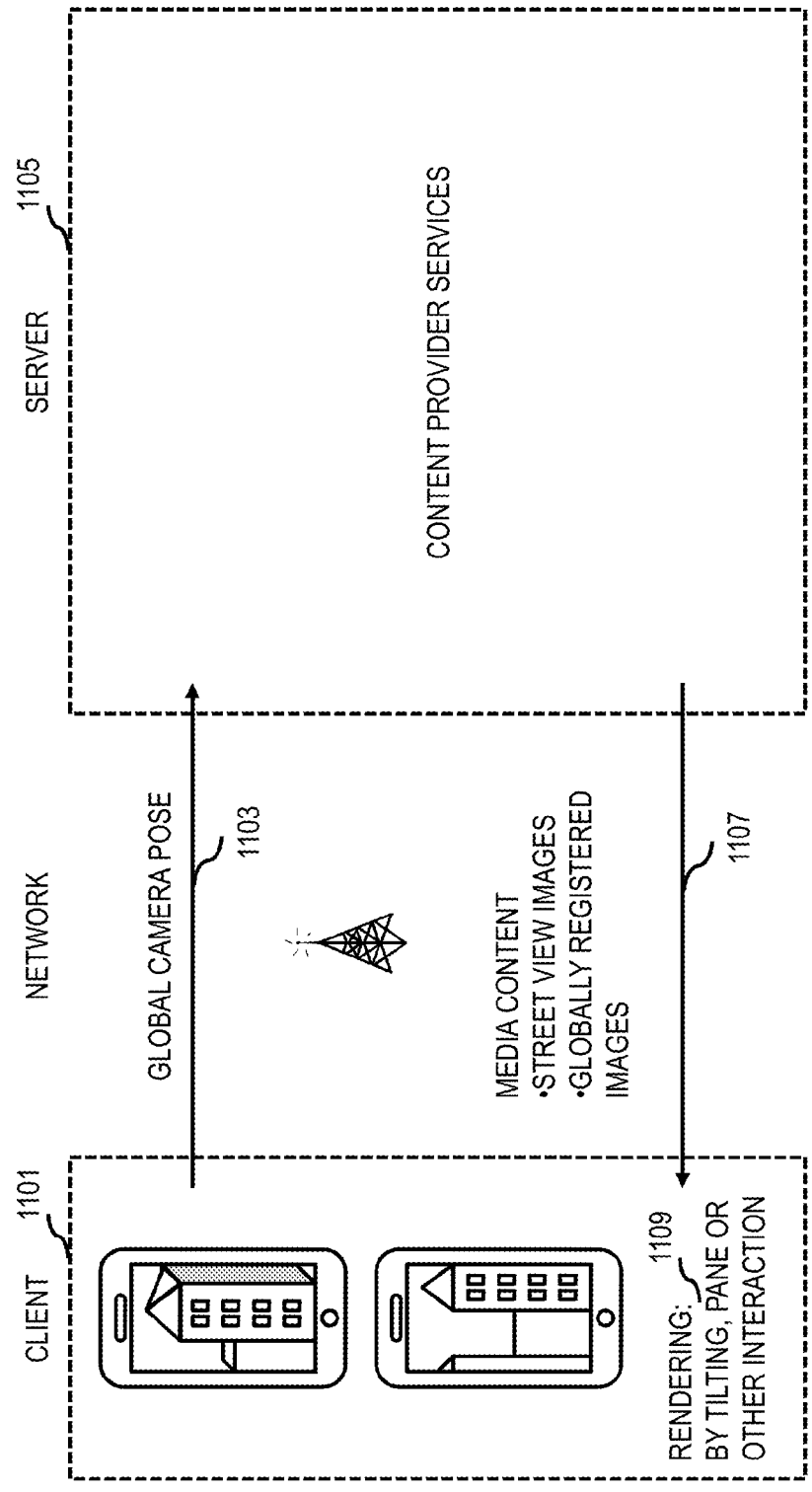
FIG. 11 is a diagram that represents the second step undertaken by the media capture platform 109 in requesting media utilized in the process of FIGS. 3-5, according to one embodiment.

FIG. 11 is a diagram that represents the second step undertaken by the media capture platform 109 in requesting media utilized in the process of FIGS. 3-5, according to one embodiment. In one scenario, once the global camera pose of an image is known, the media capture platform 109 (1101) can request (1103) relevant street view images or other globally registered images from the content provider services (1105). In another scenario, one or more users takes videos with their UEs 101, the videos are automatically uploaded to the GeoVideo tagging engine, and then the GeoVideo tagging engine generates the GeoVideo data. Then, the videos are rendered and returned to the users (1107). In one scenario, the rendering step gives the appearance to animation (1109). In one embodiment, the selected image can be rendered either in the server side or the client side. The camera parameters (pose, focal length) for image are extracted by the GeoVideo Tagging Engine, so any standard rendering technique can be used. In one scenario, the change of viewing angles may be controlled by simple user interactions, instead of a live camera view, wherein previously captured panorama images and 3D models for its rendering may be used.

Figure 12:
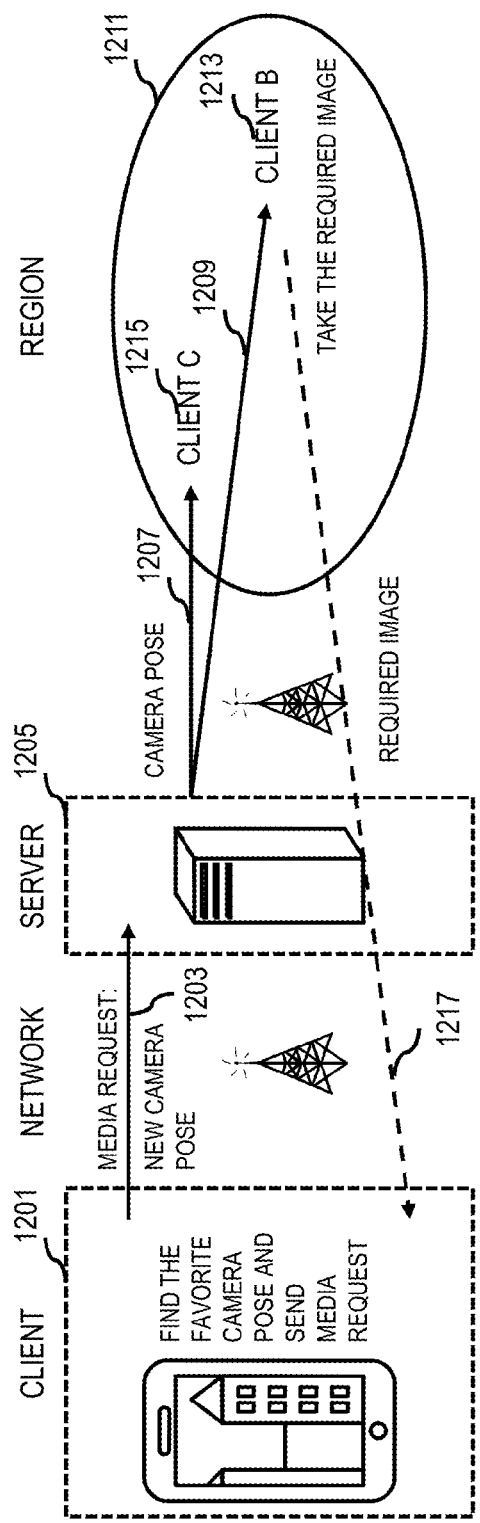
FIG. 12 is a diagram that represents the third step undertaken by the media capture platform 109 in requesting media utilized in the process of FIGS. 3-5, according to one embodiment.

FIG. 12 is a diagram that represents the third step undertaken by the media capture platform 109 in requesting media utilized in the process of FIGS. 3-5, according to one embodiment. In one scenario, the media capture platform 109 sends a request for an image with the preferred camera pose. Subsequently, after previewing some images with different camera poses, client A (1201) finds the favorite camera pose and prefers to have a newly captured image with that particular camera pose. Therefore, client A sends the media request (1203) to the server (1205). Then, the server may broadcast the requests to other clients (1207, 1209) in the region where the tourism attraction locates (1211). Once the client B (1213) and C (1215) receives the media request with the target camera pose, they can open the camera view finder and the current global camera pose may be calculated. Since both the current camera pose and the target camera pose are known, the media capture platform 109 can navigate the client to walk to the target camera pose to take the picture. Upon capture of the picture, it can be sent back to client A (1217).

The processes described herein for causing an extraction of camera pose information associated with the at least one preview image to further cause a generation of at least one request to capture at least one media item based, at least in part, on the requested camera pose information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
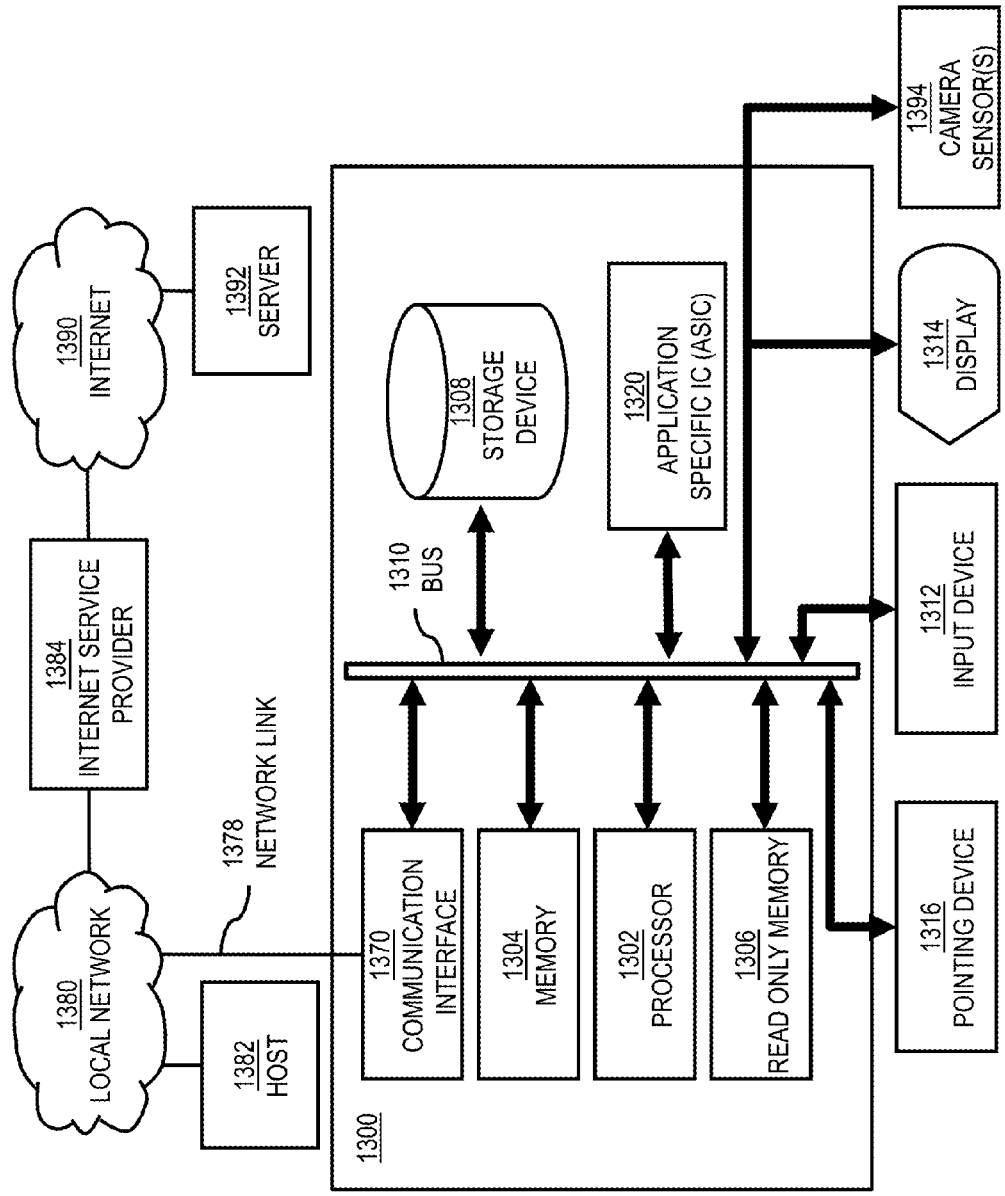
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to cause an extraction of camera pose information associated with the at least one preview image to further cause a generation of at least one request to capture at least one media item based, at least in part, on the requested camera pose information as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of causing an extraction of camera pose information associated with the at least one preview image to further cause a generation of at least one request to capture at least one media item based, at least in part, on the requested camera pose information.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to cause an extraction of camera pose information associated with the at least one preview image to further cause a generation of at least one request to capture at least one media item based, at least in part, on the requested camera pose information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1300 also includes a memory 1304 coupled to bus 1310. The memory 1304, such as a random access memory (RAM) or any other dynamic storage device, stores information including processor instructions for causing an extraction of camera pose information associated with the at least one preview image to further cause a generation of at least one request to capture at least one media item based, at least in part, on the requested camera pose information. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or any other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for causing an extraction of camera pose information associated with the at least one preview image to further cause a generation of at least one request to capture at least one media item based, at least in part, on the requested camera pose information, is provided to the bus 1310 for use by the processor from an external input device 1312, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT), a liquid crystal display (LCD), a light emitting diode (LED) display, an organic LED (OLED) display, a plasma screen, or a printer for presenting text or images, and a pointing device 1316, such as a mouse, a trackball, cursor direction keys, or a motion sensor, for controlling a position of a small cursor image presented on the display 1314 and issuing commands associated with graphical elements presented on the display 1314, and one or more camera sensors 1394 for capturing, recording and causing to store one or more still and/or moving images (e.g., videos, movies, etc.) which also may comprise audio recordings. In some embodiments, for example, in embodiments in which the computer system 1300 performs all functions automatically without human input, one or more of external input device 1312, display device 1314 and pointing device 1316 may be omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of ASICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 107 for causing an extraction of camera pose information associated with the at least one preview image to further cause a generation of at least one request to capture at least one media item based, at least in part, on the requested camera pose information to the UE 101.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention. Thus, embodiments of the invention are not limited to any specific combination of hardware and software, unless otherwise explicitly stated herein.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or any other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set or chip 1400 upon which an embodiment of the invention may be implemented. Chip set 1400 is programmed to cause an extraction of camera pose information associated with the at least one preview image to further cause a generation of at least one request to capture at least one media item based, at least in part, on the requested camera pose information as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of functions. Chip set or chip 1400, or a portion thereof, constitutes a means for performing one or more steps of causing an extraction of camera pose information associated with the at least one preview image to further cause a generation of at least one request to capture at least one media item based, at least in part, on the requested camera pose information.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to cause an extraction of camera pose information associated with the at least one preview image to further cause a generation of at least one request to capture at least one media item based, at least in part, on the requested camera pose information. The memory 1405 also stores the data associated with or generated by the execution of the inventive steps.

Figure 15:
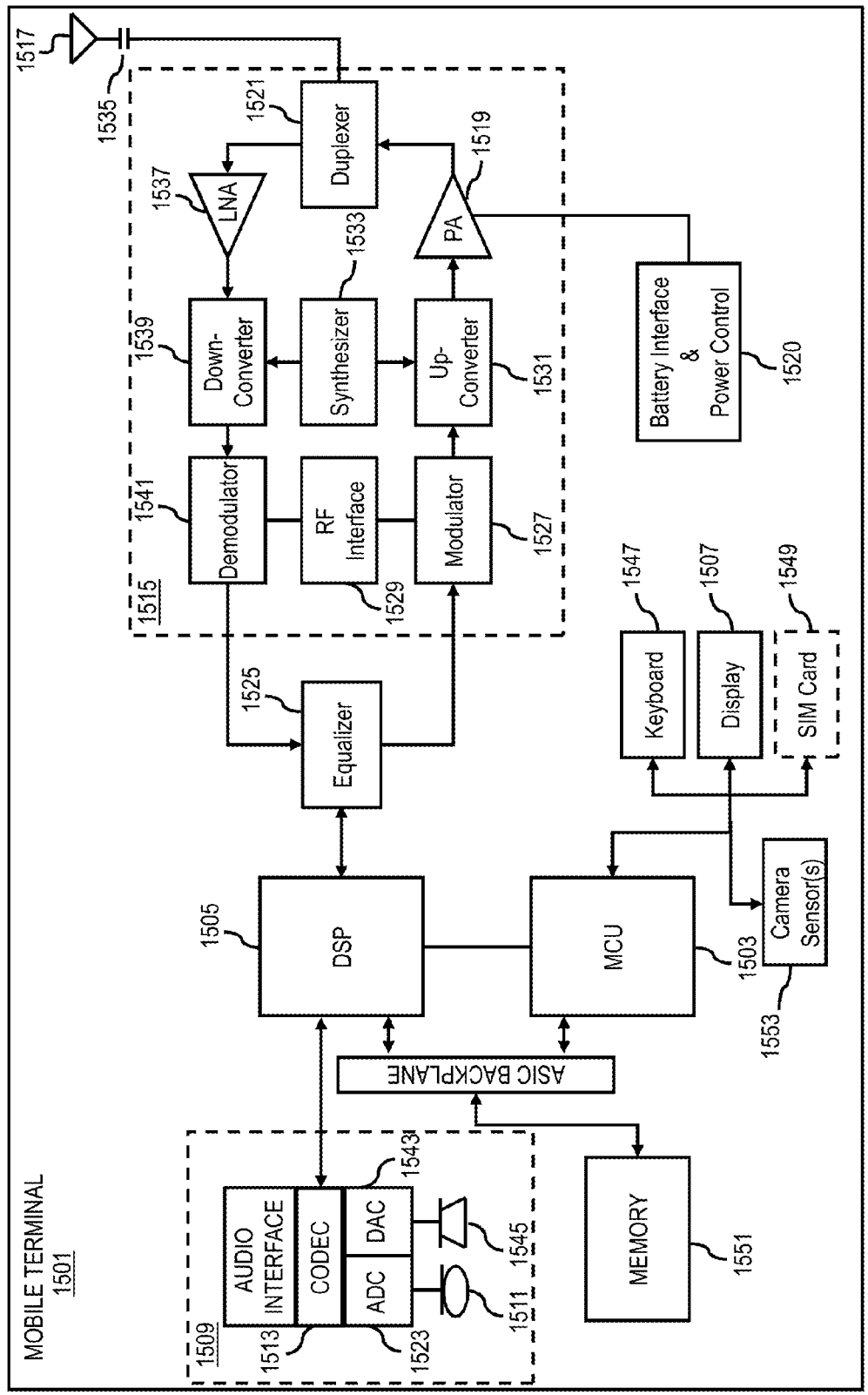
FIG. 15 is a diagram of a mobile terminal (e.g., handset) that can be used to implement an embodiment of the invention.

FIG. 15 is a diagram of exemplary components of a mobile terminal (e.g., handset) for communications, which is capable of operating in the system of FIG. 1, according to one embodiment. In some embodiments, mobile terminal 1501, or a portion thereof, constitutes a means for performing one or more steps of causing an extraction of camera pose information associated with the at least one preview image to further cause a generation of at least one request to capture at least one media item based, at least in part, on the requested camera pose information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of causing an extraction of camera pose information associated with the at least one preview image to further cause a generation of at least one request to capture at least one media item based, at least in part, on the requested camera pose information. The display 1507 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503 which can be implemented as a Central Processing Unit (CPU).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 to cause an extraction of camera pose information associated with the at least one preview image to further cause a generation of at least one request to capture at least one media item based, at least in part, on the requested camera pose information. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

Further, one or more camera sensors 1553 may be incorporated onto the mobile station 1501 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining at least one desired preview image having a particular camera pose angle/orientation from among a plurality of images at at least one device;
    processing at least one preview image presented at the at least one device to cause, at least in part, an extraction of camera pose information associated with the at least one preview image;
    determining one or more movement interactions of the at least one device relative to the camera pose information to cause, at least in part, a specification of requested camera pose information;
    a generation of at least one request to capture at least one media item based, at least in part, on the requested camera pose information;
    generating one or more indicators to notify the at least one device that the captured media item conforms with the requested media item; and
    transmitting the at least one request to the at least one device and at least one other device, based, at least in part, on a determination that the at least one device and the at least one other device, are within a vicinity of one or more locations indicated by the requested camera pose information.

2. A method of claim 1, wherein the camera pose information, the requested camera pose information, or a combination thereof is specified according to a global coordinate system.

3. A method of claim 1, wherein: an updating the at least one preview image to present based, at least in part, on one or more movement interactions.

4. A method of claim 1, further comprising:
    determining an initiation of at least one media capture application at the at least one device, the at least one other device, or a combination thereof; and
    presenting the at least one request in at least one user interface of the at least one media capture application.

5. A method of claim 4, wherein: a presentation of guidance information for directing at least one movement of the device to at least one device location, at least one device orientation, or a combination thereof as indicated by the requested camera pose information.

6. A method of claim 5, wherein the guidance information includes, at least in part, (a) one or more representative images, (b) navigation information, (c) one or more indicators for confirming compliance with the requested camera pose information, (d) wireframe guides, or (e) a combination thereof.

7. A method of claim 5, wherein the guidance information includes, at least in part, (a) one or more representative images, (b) navigation information, (c) one or more indicators for confirming compliance with the requested camera pose information, (d) wireframe guides, or (e) a combination thereof.

8. A method of claim 4, further comprising:
    causing, at least in part, a presentation of guidance information for directing at least one movement of the device to at least one device location, at least one device orientation, or a combination thereof as indicated by the requested camera pose information.

9. A method of claim 1, further comprising:
    presenting the at least one request as at least one push notification to the at least one device, the at least one other device, or a combination thereof.

10. A method of claim 1, further comprising:
    determining the at least one other device based, at least in part, on media capture capability information, media capture reputation information, social relationship information, or a combination thereof.

11. A method of claim 1, wherein the at least one preview image includes, at least in part, one or more street-view images, one or more globally registered images, or a combination thereof.

12. An apparatus comprising:
    at least one processor; and
    at least one memory including computer program code for one or more programs,
    the at least one memory and the computer program code configured to, with the at least one processor, cause the apparatus to perform at least the following,
        determine at least one desired preview image having a particular camera pose angle/orientation from among a plurality of images at at least one device;
        process and/or facilitate a processing of the at least one preview image presented at the at least one device to cause, at least in part, an extraction of camera pose information associated with the at least one preview image;
        determine one or more movement interactions of the at least one device relative to the camera pose information to cause, at least in part, a specification of requested camera pose information;
        cause, at least in part, a generation of at least one request to capture at least one media item based, at least in part, on the requested camera pose information;
        cause, at least in part, a transmission of the at least one request to the at least one device and at least one other device based, at least in part, on a determination that the at least one device and the at least one other device are within a vicinity of one or more locations indicated by the requested camera pose information.

13. An apparatus of claim 12, wherein the camera pose information, the requested camera pose information, or a combination thereof is specified according to a global coordinate system.

14. An apparatus of claim 12, wherein the apparatus is further caused to:
    cause, at least in part, an updating the at least one preview image to present based, at least in part, on one or more movement interactions.

15. An apparatus of claim 12, wherein the apparatus is further caused to:
    determine an initiation of at least one media capture application at the at least one device, the at least one other device, or a combination thereof; and
    cause, at least in part, a presentation of the at least one request in at least one user interface of the at least one media capture application.

16. An apparatus of claim 12, wherein the apparatus is further caused to:
    cause, at least in part, a presentation of the at least one request as at least one push notification to the at least one device, the at least one other device, or a combination thereof.

17. An apparatus of claim 12, wherein the apparatus is further caused to:
    determine the at least one other device based, at least in part, on media capture capability information, media capture reputation information, social relationship information, or a combination thereof.

18. An apparatus of claim 12, wherein the at least one preview image includes, at least in part, one or more street-view images, one or more globally registered images, or a combination thereof.

* * * * *